United States Patent
Whiteman

(10) Patent No.: US 10,421,310 B2
(45) Date of Patent: Sep. 24, 2019

(54) METHOD OF FORMING A SECURITY DOCUMENT

(71) Applicant: DE LA RUE INTERNATIONAL LIMITED, Basingstoke, Hampshire (GB)

(72) Inventor: Robert Whiteman, Berkshire (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 52 days.

(21) Appl. No.: 15/123,777

(22) PCT Filed: Mar. 6, 2015

(86) PCT No.: PCT/GB2015/050653
§ 371 (c)(1),
(2) Date: Sep. 6, 2016

(87) PCT Pub. No.: WO2015/132607
PCT Pub. Date: Sep. 11, 2015

(65) Prior Publication Data
US 2017/0015130 A1    Jan. 19, 2017

(30) Foreign Application Priority Data
Mar. 6, 2014 (GB) .................................. 1403991.1

(51) Int. Cl.
*B42D 25/355* (2014.01)
*B42D 25/364* (2014.01)
(Continued)

(52) U.S. Cl.
CPC ........... *B42D 25/355* (2014.10); *B42D 25/21* (2014.10); *B42D 25/36* (2014.10); *B42D 25/364* (2014.10);
(Continued)

(58) Field of Classification Search
CPC ..... B42D 25/355; B42D 25/364; B42D 25/41
See application file for complete search history.

(56) References Cited

U.S. PATENT DOCUMENTS

| | | |
|---|---|---|
| 4,652,015 A | 3/1987 | Crane |
| 2006/0145468 A1 | 7/2006 | Plaschka et al. |

(Continued)

FOREIGN PATENT DOCUMENTS

| | | |
|---|---|---|
| EP | 0 059 056 A1 | 9/1982 |
| GB | 2 347 646 A | 9/2000 |

(Continued)

OTHER PUBLICATIONS

Sep. 3, 2014 Search Report issued in British Patent Application No. 1403991.1.

(Continued)

*Primary Examiner* — Kyle R Grabowski
(74) *Attorney, Agent, or Firm* — Oliff PLC

(57) ABSTRACT

A method of forming a security document, comprises providing a thread comprising at least one region of heat-transformable material, this material having an optical effect which is transformable in response to applied heat. The thread is integrated with a document substrate material during a substrate forming process, so as to produce a security document substrate having at least one windowed region in which the thread is exposed at the substrate surface, and at least one bridge region in which the thread is not exposed. A patterned heat process is then applied, causing a structural modification in the heat-transformable layer of the thread so as to produce an observable optical effect representative of the heat pattern at one or more predetermined positions with respect to one or more of the said windowed region or bridge region. Security documents bearing threads with such optically transformable materials are also disclosed.

18 Claims, 8 Drawing Sheets

(51) Int. Cl.
*B42D 25/41* (2014.01)
*D21H 21/42* (2006.01)
*D21H 21/44* (2006.01)
*D21H 21/48* (2006.01)
*B42D 25/36* (2014.01)
*B42D 25/21* (2014.01)
*G02B 1/00* (2006.01)

(52) U.S. Cl.
CPC .............. *B42D 25/41* (2014.10); *D21H 21/42* (2013.01); *D21H 21/44* (2013.01); *D21H 21/48* (2013.01); *G02B 1/005* (2013.01)

(56) References Cited

U.S. PATENT DOCUMENTS

| | | | | |
|---|---|---|---|---|
| 2008/0036195 | A1* | 2/2008 | Winchcombe | B42D 25/328 283/85 |
| 2010/0001509 | A1* | 1/2010 | Whiteman | B42D 25/355 283/91 |
| 2010/0045027 | A1* | 2/2010 | Whiteman | B42D 25/355 283/107 |
| 2010/0253061 | A1* | 10/2010 | Whiteman | B42D 25/382 283/85 |
| 2014/0103632 | A1* | 4/2014 | Camus | B42D 25/21 283/67 |
| 2016/0108581 | A1* | 4/2016 | Olmos | B42D 25/355 283/85 |
| 2016/0339733 | A1* | 11/2016 | Holmes | B42D 25/355 |

FOREIGN PATENT DOCUMENTS

| | | | |
|---|---|---|---|
| GB | 2390056 A | 12/2003 | |
| GB | 2 414 962 A | 12/2005 | |
| WO | 00/039391 A1 | 7/2000 | |
| WO | 00/54985 A1 | 9/2000 | |
| WO | 03/091952 A2 | 11/2003 | |
| WO | 03/091953 A2 | 11/2003 | |
| WO | 2009/053673 A1 | 4/2009 | |
| WO | 2009/143625 A1 | 12/2009 | |
| WO | 2011/151638 A1 | 12/2011 | |
| WO | WO-2012162805 A1 * | 12/2012 | ............... B41J 2/32 |
| WO | 2013/054117 A1 | 4/2013 | |

OTHER PUBLICATIONS

May 20, 2015 Search Report issued in International Patent Application No. PCT/GB2015/050653.

* cited by examiner

METHOD OF FORMING A SECURITY DOCUMENT

FIELD OF THE INVENTION

The present invention relates to a method of forming a security document, in particular forming a security document containing a windowed thread. The invention also relates to security documents with windowed threads, including those formed by the method.

BACKGROUND TO THE INVENTION

The use of security threads in security documents, particularly bank notes, has become widespread over many years. For example the presence of a security thread is one of the most well recognised security features in United Kingdom currency. Security documents containing security threads have developed with ever increasing levels of sophistication. For example such threads may be provided with a repeating printed pattern of characters along their length, or may contain regions of magnetic material for machine-readable detection. One of the most striking visual developments of such threads is in the concept of a "windowed" thread in which windows are formed in the document substrate during its manufacture so as to expose the thread embedded within the document. The regions between the windows are known as bridges and in these regions the substrate material is formed over the thread such that the thread remains buried.

A significant security benefit would be gained if indicia on a windowed security thread could be positioned in register with the windowed areas. Moreover, such registration necessarily means that images may also be concealed under the paper bridges and provide features that may only be visible in transmission.

To date, such registration capability remains impractical since current production processes do not permit threads to be registered to achieve these desired effects. Instead, an arbitrary offset occurs between the bridge positions and thread design, giving rise to ill-centred or incomplete images in the window.

Not surprisingly attempts have been made to adjust the relative position of the thread to the window during the paper making process. Most notably trials have been undertaken to adjust the tension on the thread-feed during the paper making process. These have experimented with a closed loop feedback architecture, where a control signal is derived from an image capture system monitoring a selected window position. However, in practice, this approach has proved to be particularly difficult to implement, and little success has been achieved for anything other than particularly narrow threads.

The desire to achieve registration between images upon threads and the windows of the substrate remains strong. Most broadly, the goal is to find a method to facilitate the arbitrary positioning of images and motifs relative to the thread window, or (if required) the positioning of arbitrary and differing designs in each window. Furthermore an additional challenge is faced in that, in practice, such a method would need to integrate readily with the normal established processes of security document production, not least since such processes are required to meet the most exacting of production standards.

SUMMARY OF THE INVENTION

In accordance with a first aspect of the present invention we provide a method of forming a security document, comprising:

i) providing a thread comprising at least one region of heat-transformable material, said material having an optical effect which is transformable in response to applied heat;

ii) integrating the thread with a document substrate material during a substrate forming process, so as to produce a security document substrate having on at least one surface at least one windowed region in which the thread is exposed at the substrate surface, and at least one bridge region in which the thread is not exposed, and thereafter iii) applying a patterned heat process thereby causing a structural modification in the one or more regions of heat-transformable material of the thread so as to produce an observable optical effect representative of the heat pattern at one or more predetermined positions with respect to one or more of the said windowed region or bridge region.

In addressing the problems discussed earlier in relation to providing accurate registration of images upon threads we have realised that with the use of certain structured interference materials, including new photonic materials, and a different approach to achieving the desired aim, it is possible to produce images upon or within the threads of security documents in a manner which is registered with the position of the thread within the security document. This provides the highly desired ability to register images with respect to the windows of security threads.

Structured interference materials are those which comprise regions, typically in the form of layers of different materials or crystalline arrays of particles or voids in a matrix, with differing refractive indices. When illuminated by white light they specularly reflect back a selected band or bands of wavelength or colour which satisfy the condition for constructive interference between each of the partial amplitudes internally reflected within the structure of the material at each interface between the regions with different refractive indices. Examples of interference materials suitable for use as heat-transformable materials with the present invention include thin film interference structures and photonic crystal structures. Thin film interference structures comprise repeating layers of different refractive indices, examples can include purely dielectric stacks (metal oxide or polymer) or those composed of alternate dielectric and metallic layers. Thin film interference structures are also known as Bragg stacks or 1D photonic crystals. Examples of tuneable Bragg stack structures suitable for use with the current invention can be found in WO2009/143625.

Photonic crystal materials exhibit a periodic change in refractive index and, according to the spatial variation in the refractive index, are classified as one-dimensional (1D), two-dimensional (2D) and three-dimensional (3D). 1D photonic crystal structures correspond to thin film interference structures. 2D and 3D photonic crystal structures are structured optical materials in which the refractive index varies periodically in two or preferably three dimensions. These materials exhibit a range of interesting optical effects when subject to electromagnetic radiation of a wavelength comparable to the spatial modulation of the refractive index. Bragg reflection may occur over a range of wavelengths that depend on the direction of incidence/propagation and the periodicity of refractive index variation. This gives rise to photonic 'energy gaps' that are analogous to the electronic band gaps in semiconductors. Typically, electromagnetic waves within a certain frequency range cannot propagate in particular directions within the crystal, and incident electromagnetic radiation at these wavelengths is consequently reflected. It is the presence of such partial photonic band gaps that gives rise to the angular dependent colour replay.

Recent developments now provide thermally patternable colourshift materials that may be incorporated into structures suitable for use as banknote security threads. The thermal threshold of such materials may be engineered to be sufficiently high as not to be sensitive to the elevated temperatures present during the "paper making" process. Thus such a thread may be inserted into the substrate paper and remain substantially unaltered by the paper making process. We have realised that, critically, this makes available the option of providing the image to the thread after the thread has been incorporated into the substrate. This "post-insertion marking" may then become technologically and indeed commercially viable if a process in security document production can be identified that may be readily adapted for the "marking" task, namely the laying down of the image. Such a process must be a downstream process capable of imposing an appropriate thermal load, with precision, to selected areas of the thread.

Fortunately, such a downstream process exists. In banknote processing for example, banknotes frequently pass through a banknote foiling system. These typically apply banknote foils by transferring a foil structure from a carrier ribbon to a banknote via a combination of heat and pressure. As one example, the foiling apparatus could be modified such that, rather than being configured to apply hot foil, instead it could simply operate in a registered stamping mode and contact the thread structure directly. Such systems operate at high line-speeds, which are entirely compatible with other production processes.

The downstream process of the current invention can be imposed on the substrate when it is in either web form or sheet form.

In order to avoid the need to otherwise modify a security document production method, preferably the materials chosen for the thread, including the heat-transformable material, are arranged to be substantially unaffected by the substrate production process which includes thread integration. Furthermore it is preferred that the thread materials are substantially unaffected by prolonged exposure (of the order of minutes) to the highest temperature attained by the security document substrate during its production. In practice therefore, the patterned heat process is applied at a temperature in excess of a maximum temperature used in the substrate forming process of step (ii). Most preferably the thread materials are arranged to be substantially unaffected by prolonged exposure to a temperature of at least 10 degrees Celsius in excess of the maximum temperature attained by part of the security document during its substrate production process. Typically the security thread material is arranged to withstand prolonged exposure of at least 130 degrees Celsius, preferably 140 degrees Celsius.

In principle the heat-transformable material may be provided upon or within the thread in a number of different forms, somewhat dependent upon the material from which the thread is formed and the nature of the heat-transformable material. One advantageous manner in which the heat-transformable material may be provided on or within the thread is in the form of a layer. Again, the method by which such a layer is applied is rather dependent upon the nature of the thread and the heat-transformable material. Typically such a layer is present upon an external surface of the thread material so as to provide for the most convenient application of heat.

The heat may be provided by a conductive process (for example by physical contact), although it may also be provided using a radiative process. Some form of thermally radiative element and heat shield mask could be employed or indeed an infra-red laser may be utilised. A non-infrared laser might also be used if the heat-transformable material, or adjacent material, were provided with an absorptive material which became hot upon receipt of non-infrared radiation (such as red light). Regardless of the method of applying heat it is desired that the patterned heat process applies a localised elevated temperature, sufficient to cause the structural modification, to the heat-transformable material in a two dimensional pattern. In practical terms it may be beneficial for all parts of any image to be printed to be contiguous in the sense that heat may be conducted to all parts of the image within the die structure. The image quality, in terms of resolution of any image, is therefore dependent upon the extent to which the localisation of the heating may be achieved. This may vary between different processes although in the case of a contact-based conduction process the geometry and materials forming any contact die are important. The application of pressure may improve conductive contact between a contact die and the thread. This may be particularly important if attempting to pattern material in a region which is buried under intervening substrate material (such as in the case of a bridge).

If a laser is used to apply the heat then it is also possible to mark the substrate at the same time as the heat transformable material and therefore it is possible to either produce two marks in register one on the substrate and one on the heat-transformable material or a single mark/design which is continuous across both the substrate and the heat-transformable material. Suitable lasers for the marking of paper substrates are known from US20060145468 although a modulation of the laser power would be used.

In order to provide greater functionality in terms of a security feature which is only visible when light is passed through the thread, the patterned heat process is applied to the bridge region so as to cause the structural modification in the heat-transformable material by transmission of the said heat to the heat-transformable material via intervening substrate material forming the bridge. Such transmission may be by radiation penetration (including situations where the radiation is not of infra-red wavelengths itself but is converted to heat upon absorption) or by a conduction process. An image upon a buried thread is only observable in transmission and not under reflection conditions and, as such is much more difficult to counterfeit. For this reason the ability to "post insertion image" an embedded thread beneath a bridge region is particularly advantageous.

The structural modification which the heat-transformable material undergoes as a result of the applied heat treatment is preferably one in which an interference structure remains afterwards. For example in the case of a photonic crystal the structure preferably remains ordered afterwards. This allows for optical effects (such as colour effects and/or optically variable effects) to be produced by the processed regions. These provide additional beneficial security features which are very difficult to counterfeit. The change in the structure may therefore be characterised in terms of modifications of the characteristic lattice parameters or in terms of the relative refractive indices of two-component structures (for example matrix and particle, including "particles" in the form of voids as well as solid or liquid particles which are generally non-compressible). In the case of the transformation of the material into an essentially disordered structure then the resultant optical effect will be observable as being in contrast with the surrounding unprocessed material which will exhibit optical structured interference effects. It is preferred for security applications that such a modification of the structure is irreversible in the sense that at least no further processing technique exists which might reasonably return the structure to a reasonable facsimile of its former structure prior to application of the heat treatment, without causing substantial damage to or destroying the security document itself.

Various methods are known for the production of structured interference materials including photonic crystals, these including the use of core-shell particle systems. There has been a prevalence for the use of solid particles arranged regularly in a matrix in order to produce photonic crystals although the present example rather unexpectedly benefits from inverse opal structures in which gas-filled voids take the place of particles. These structures advantageously allow closer control of optical characteristics as a function of an applied thermal cycle. Preferably therefore the heat-transformable material is a photonic crystal having an inverse opal structure in which a periodic array of voids is provided within a matrix material. Certain thermally patterned materials (for example Opalux's Opalprint) offer a particular commercial advantage when deployed in this manner. Opalprint transitions through a range of (colour-shifting) colours as a function of the patterning temperature and dwell time. Hence there is only the requirement to hold a single colour-shifting base stock to accommodate a selection of colours and design requirements for a diverse range of customers.

Processes which involve the application of foils to a substrate using hot stamping take place with the substrate in either sheet or web form. In sheet fed processes which involve the application of foils using hot stamping or an equivalent technique, the foil placement is typically registered with reference to the edge of a sheet comprising a single or more often an array of security documents. The edge of the sheet is established as part of an earlier process with reference to watermark features imposed during the paper making process. A similar technique of registering with reference to the sheet edge may be used in the present method to provide registration between an image and a particular location upon a thread with respect to a security document in which the thread is embedded. However, the patterned heat process is preferably applied at a position with respect to the security document which is registered with respect to one or each of the windowed region or bridge region. The registration with respect to the regions themselves provides the most accurate positioning technique and therefore in a sheet or web fed process the detection of the window or bridge region may be used to achieve the correct positioning of the patterned heat process. However, the detection of the location of such a window or bridge region may require a sophisticated imaging technique. The use of a reference symbol printed upon or incorporated into the sheet provides an alternative method. For example a light watermark could be incorporated into the sheet and used as a reference symbol which can be detected in transmitted light. Of course a combination of such techniques may be used.

The present method may be applied to security documents in a number of innovative and advantageous ways. In a relatively simple approach, when a plurality of windowed regions are present then the said patterned heat process may be applied to two or more of the said plurality of regions. It follows that this technique relies more heavily upon good registration being achieved at multiple locations along the thread. Furthermore, when a plurality of bridge regions are present then the said patterned heat process may be applied to two or more of the said plurality of regions. These two alternatives may also be used in combination. In any of these situations different heat patterns may be utilised according to the region which is processed. Due to the different local conditions upon applying the heat process it may be necessary to use different heating process parameters to achieve the respective window region and bridge region processes. When the one or more windowed regions are processed and the one or more bridge regions are processed, the method may comprise applying a first pattern to the windowed regions and a second pattern, different from the first pattern, to the bridge regions.

The optical effect produced by the influence of heat on the heat-transformable structure may take a number of forms. For example the geometry of the affected material may not be a true copy of the heat profile geometry of the heat source (such as a stamping die). This might be the case where localised conduction in the heat-transformable material may cause structure modification in areas which surround those receiving the heat most directly from the apparatus. For example with a heat profile in the shape of a circle, the interior of which is filled with fine grid lines, the resultant modification in the structure may have a geometry of a fully filled circle (absent the grid detail). Thus the optical effect would be a low resolution copy of the heat source geometry rather than what may be thought of as an image of that profile.

In the case of conductive contact the heat profile provide by the contacting member such as a die may conform with the a modulated contact surface of the die such that localised regions which are designed to deliver the thermal energy and which make up the "image" are arranged to project away from a general surface of the member. In this way the heat energy and any localised pressure is concentrated within these regions. Such projections may collectively be through of as an image relief in the general member surface. Of course a complementary image may also be formed by causing projections representing the non-image regions.

The optical effect may simply cause a change in the frequency band(s) which are reflected and transmitted, providing a non-variable change in colour (or the equivalent in non-visible parts of the spectrum). It may cause a change between an optically invariable effect and an optically variable effect (as a function of viewing angle). It may cause a change between two different optically variable effects. It may cause a change between total reflection at all incident wavelengths (a full photonic band gap) and partial band transmission. In each case the effects above, which the change is between, may be from initial effect to final effect or final to initial. In general therefore the heat-transformable material has an initial optical effect prior to step (iii) and, following application of the patterned heat process the said observable optical effect is different from the said initial optical effect. In each case, at least one of the said initial optical effect or said observable optical effect is an optical effect in one or more of the infra-red, visible or ultraviolet regions of the electromagnetic spectrum.

In order to provide additional security effects the method preferably comprises applying a first patterned heat process to a first region of the thread and applying a second patterned heat process to a second region of the thread, wherein the first and second patterned heat processes are different and result in respective different observable optical effects. This may result in different image shapes or different optical effects with the same or different image shapes.

The application of the patterned heating may be achieved in a number of ways by conductive methods such as the application of a heated die to the security document surface, such a die being provide by a linear or rotary stamping apparatus; alternatively the energy for the heating may be delivered by a laser or other intense source of radiation.

Typically all modifications to the structure within a thread are provided by the same apparatus.

Whilst many known threads are relatively narrow in lateral dimension, such that the window and bridge regions are of a similar width as the thread, more recently it has become possible to produce wider threads. In such a case the window may only occupy a part of the width of the thread (such as a central part). The surrounding material upon either side may be thought of as an extended bridge region also. Thus, when the thread is wider than a windowed region such that the windowed region is bordered by a bridge region, a first image may be placed within the windowed region and a second image may be placed within the bridge region laterally adjacent the first image. Such wider threads also may be used to provide "two-sided" windows where a windowed region is provided upon each side of the security document at a common location so as to produce a two-sided window within which the security document substrate is absent. This allows part of the document to become transparent to an observer and an optical effect caused by the present process (such as an image) may be placed within such a region. Such two-sided windows bearing images provide the ability to view the image in transmission and reflection.

The method is typically performed as part of an existing security document production process. In addition to the steps (i) to (iii) of the method, in producing a security document the method may further comprise applying to the security document one or more of: a foil, a holographic optical element, printing ink, intaglio printing.

In accordance with a second aspect of the present invention we provide a security document comprising a substrate within which is integrated a partially embedded thread having at least one region of heat-transformable material, said material having an optical effect which is transformable in response to applied heat, the said security document having on at least one surface at least one windowed region in which the thread is exposed at the substrate surface, and at least one bridge region in which the thread is not exposed, wherein the said heat-transformable material includes a locally heat-modified structural modification, so as to cause an observable optical effect representative of the pattern of said applied heat, at one or more predetermined positions with respect to one or more of the said windowed region or bridge region.

Typically the security documents according to the second aspect are formed using a method according to the first aspect. The security documents may be embodied in a number of different forms including: banknotes, cheques, passports, identity cards, certificates of authenticity, fiscal stamps, or other documents for securing value or personal identity.

DESCRIPTION OF EXAMPLES

We now describe a number of different examples of security documents containing threads, the threads having the heat-transformable material provided as a layer to which is applied a patterned heat process. Common to the production of each of these example security documents is a general method of forming the security documents and this is now firstly described in relation to FIG. 1.

Figure 1:
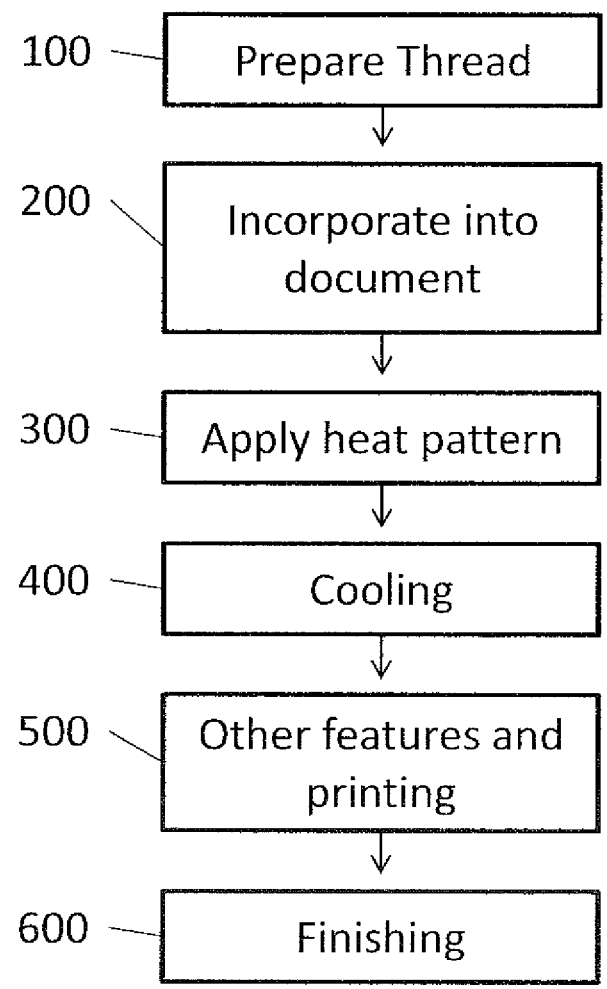
FIG. 1 is a flow diagram of a general method applicable to each example.

FIG. 1 is a flow diagram of the key stages in the process of forming such a security document. Initially, at step 100, a thread is obtained which includes at least one region of heat-transformable material. The heat-transformable materials in accordance with this invention include structured interference materials such as photonic crystal materials. There are a number of known methods of forming such materials, although, until relatively recently, it would not have been deemed practical to apply such materials to a security thread material. Typically for use in the present application, a thread material of polypropylene (PP) or polyethylene terephthalate (PET) is beneficial due to a relatively high glass transition temperature allowing the thread to be subjected to a heat process which, on the one hand, is sufficient to modify the structure of the heat-transformable material and yet leaves the PP or PET material substantially unchanged. It is particularly beneficial to utilise heat-transformable materials of the type mentioned above if they are available in the form of thin films, particularly including self-supporting films. An example of such a material is a product "Opalprint" available from Opalux Inc. (www.opalux.com).

Returning to FIG. 1, the form of the thread is therefore typically an elongate and relatively narrow strip of PET or PP material upon one side of which is adhered or deposited a layer of photonic crystal material. Since many security documents are produced from the subdivision of larger sheets during their manufacturing process, whilst it is conceivable that the heat-transformable material may be applied in only specific regions of the thread substrate, in practice it is deemed more useful to apply the material over substantially one entire surface of the thread substrate.

Having obtained the thread, the method then proceeds to step 200 in which the thread is incorporated into the document substrate material. In the context of a security document in the form of a bank note for example, the thread is formed integrally with the "paper" substrate by being introduced during the "paper forming" process. Thread incorporation is a well-known technique based upon watermarking technology. This is particularly the case for the production of a "windowed" thread which is a thread in which various parts of the thread along its length are exposed to the external environment. These regions are "windows" in which the substrate material is thinner than in the adjacent "bridge" regions of the thread where the thread material itself is covered by the document substrate material. This gives the appearance of the thread weaving in and out of the surface of the substrate although in practice the thread remains planar and it is in fact the thickness of the substrate itself which is modulated. Techniques for the production of such window threads have been known since the early 1980s, a key disclosure of which is within patent publication number EP0059056. Subsequent disclosures and patent publications build upon this technology, amongst which, of note, is the International patent publication WO00/39391 which is concerned with the embedding of threads using their edges. This has led to the development of security features such as OPTIK® available from the present applicant.

For this reason, these techniques are not required to be described further herein since the modification of the thread itself to include heat-transformable material does not present a substantial additional technological challenge in terms of the incorporation of threads into such security documents.

As has been mentioned, typically security documents such as bank notes are formed in large sheets with multiple threads running through the sheets so as to form an array of eventual individual bank notes. Due to the processing parameters, which include: the fact that the sheets are relatively large, the threads are relatively small in dimension, the speed of processing is high, and the thread is under tension during incorporation, it is extremely difficult to ensure that any particular location upon a thread is present in a desired position such as in a particular window of a bank note.

Of course, there exist other security devices, in addition to security threads, which are applied to the bank notes at a stage after the incorporation of the thread itself and whilst the security documents remain as sheets. Such additional features which include holographic elements, specialised printing inks and particular printing techniques (such as intaglio printing) all require a relatively precise positioning on the security documents. Thus, there exist various techniques for the registration of such features with respect to the documents themselves. These however are impractical for use during the paper making process. Whilst it is extremely difficult to control the thread embedding process during paper making in order to produce a particular thread position to be registered within a window in the document, the present applicant has realised that it is however possible to apply a heating process to a particular region of thread (for example in a window or in a bridge region), once it exists within the document, with the required level of accuracy. For example, techniques used to apply holographic optical elements may be implemented with the present technique so as to provide the step of applying a patterned heat process to a particular thread location.

Therefore, at step 300, such a patterned heat process is applied to the document and in particular at least a part of the thread. For example, a heated die, heated to a temperature of about 150° C. is used to apply the heat to the heat-transformable material. The die is patterned in a way such that, for example, the heat is applied in a very precise manner. For example if the pattern takes the form of an "O", then the duration and pressure applied as the die impacts with the security document will generally only cause regions of the security document which are specifically in contact with the projecting "O" feature of the die to attain the temperature of around 150° C., with closely surrounding parts remaining at a substantially lower temperature which is insufficient to cause modification of the heat-transformable material. The factors which control this heat transfer process include the material from which the dye is fabricated, the duration of contact, the applied stress (around 1 tonne per square centimeter), and the relative conductive properties of the materials themselves. These parameters may be optimised experimentally and commercial compromises made due to other process requirements such as the rate of production of the documents.

In general however a hot stamping die process similar to that used to provide holographic optical elements, is beneficial. It will be understood by those of ordinary skill in the art that such a process may be put into effect by rotary stamping or linear stamping, depending upon the application requirements. In some applications it may not be necessary to provide physical contact and therefore a "stress free" technique may be used which could be implemented by a heat delivery system in the form of a laser. In this case, the patterning may be produced by a shaped or scanned laser beam.

In order to provide a security document product of high quality, it is beneficial to be able to deliver the heat patterning with a high degree of spatial precision. Since the document substrate material is subject to natural variations as a complex structure, rather than registering the position of the apparatus for applying the heat with respect to a physical datum of the processing apparatus, it is preferred to use a feature of the security document itself to provide the registry position. For example, the edges or corner of the document sheet may be used to track the relative position of the threads. Or preferably still, the registry may be taken from printed features on the documents or indeed from the output of data of imaging equipment which specifically locates the window or bridge regions of the thread itself.

Regardless of whether the heat is applied by a conductive or radiative technique, taking the photonic crystal material as an example, in regions to be transformed by the heating, the temperature and duration of the heating process is such that the structure of material is physically modified. Photonic crystal materials are typically formed from an interconnected matrix material of a first type within which is positioned a regular array of regions of material of a second type. Such regions of second type material may take the form of spheres for example. It is the difference between the refractive indices of the two types of materials and their regular spacing that allows the creation of the photonic optical effects. It should be noted that the second material itself may be simply a void filled for example with a gas such as air. In order for the heating effect to cause an optical effect then some physical modification of the structure is needed. This might involve the swelling or contraction of the matrix material or indeed the regions of second material. This in turn causes the periodicity of the structure to change which causes consequential modification of the optical effect observed in response to incident light.

It is envisaged that the application of heat itself may cause sufficient destruction to the structure so as to prevent any photonic effects from being observed in a region where the heat is applied. Nevertheless this will of course cause an overall optical effect since there will be an optical effect contrast between the regions treated and those which are not.

It is preferred however that, following the heat treatment, the material remains essentially photonic in its behaviour albeit with different photonic material properties. The use of an inverse opal structure containing voids rather than particles of a solid material, is particularly beneficial for this latter type of effect in which the swelling or shrinkage of the matrix itself may be controlled as a function of the duration and/or temperature of the heat applied (above a critical base temperature). Thus the use of an inverse opal structure allows different photonic effects to be produced in different regions depending upon the corresponding heat treatment processes. A first heat treatment may cause a first optical effect in a first region of the thread and a second heat treatment of a different type may cause a second optical effect which is different from the first in a second region of the thread.

In addition to the application of the heat to an exposed region of material within a window, the heat-transformable material in a bridge region can likewise be treated by relying for example on the thermal conductivity of the substrate material in the bridge region or indeed the intensity of radiation in the case of a laser-induced or other high-intensive radiation process.

Returning to FIG. 1, following application of each of the desired heat treatments to the various regions of the thread, the security document is then allowed to cool at step 400. Depending on the processing speed, natural cooling may be applied although enhanced cooling with the use of fans or a chilled air flow could also be used.

Thereafter at step 500, the document is subjected to the application of other features such as holograms and other security elements, together with other printing techniques. We note here that some or all of the printing may occur earlier in the process also, prior to step 300.

At step 600, the process finishes with the final "finishing" processes being applied to the security documents including cutting, stacking and batching processes.

We now refer to some examples of threads which are suitable for use in implementing the present invention. We then provide examples of security documents containing embedded threads in which the structure of the heat-transformable material has been modified so as to create a motif or image in one or each of the windowed or bridge regions of the embedded threads.

Figure 2:
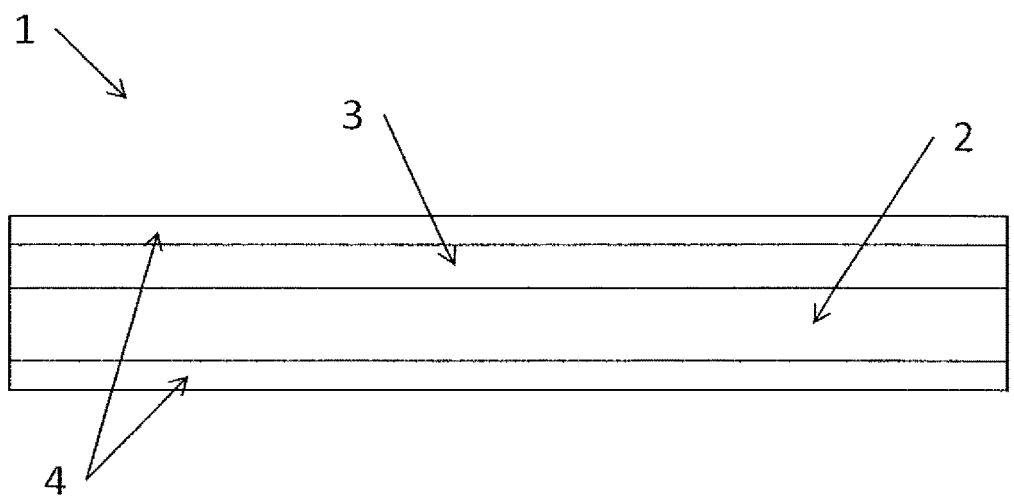
FIG. 2 shows a section through an example thread having a heat-transformable layer.

FIG. 2 shows an example thread construction for the current invention. The thread 1 is formed from a length of PET, acting as base thread material 2. Upon one elongate face of the thread material 2 is located a layer 3 of heat-transformable material (for example a photonic material, 1D Bragg stack or other structured interference material) for thermal patterning. Adhesive coatings 4 are added to each of the layer 3 and the opposing elongate face of the thread material 2 to adhere the thread to the document substrate (such as bank note paper). These adhesive coatings are optional but are preferably applied to both external sides of the combined structure.

Figure 3:
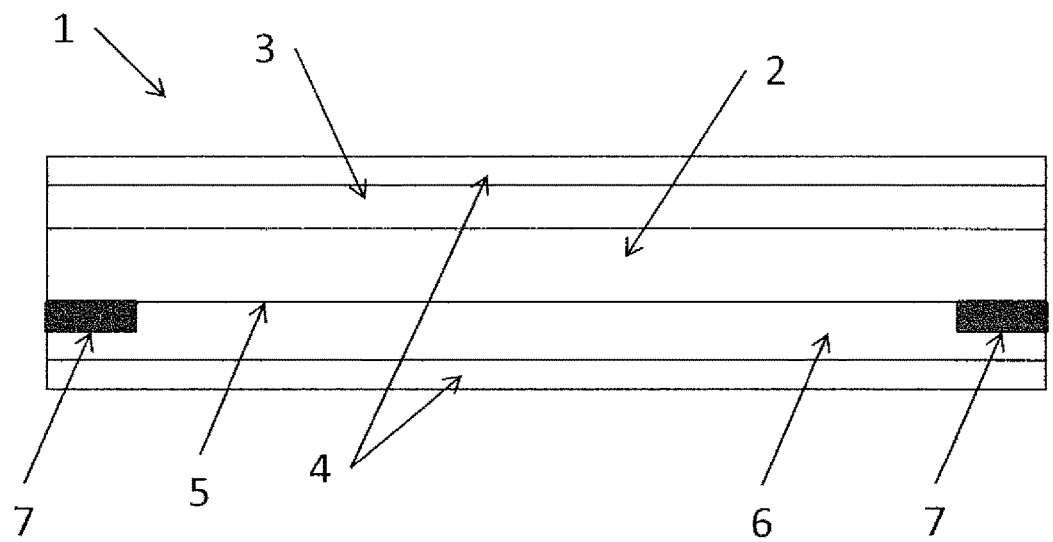
FIG. 3 shows a section through an example thread bearing machine-readable material.

The security device formed by the heat-treated thread can be made machine readable by the introduction of machine-detectable materials in any of the existent layers of the thread or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials. FIG. 3 shows an example thread containing such machine-readable features. Similar reference numerals are used in this and the following examples to denote analogous features. In comparison with the example of FIG. 2, in this case the face 5 of the thread material 2 which is opposite to that bearing the layer 3 is generally covered with a fluorescent masking coat 6. At a number of locations at the interface between the thread material 2 and coating 6 are positioned discontinuous regions of a magnetic layer 7. The magnetic material used to form the layer 7 is a conventional dark opaque magnetic material in this case. This is concealed by the heat-transformable layer 3 from one side and by the masking coating 6 on the other side. In this example the masking coating 6 comprises a fluorescent material as a further authentication feature. Alternatively the masking material may be a vapour deposited metallic layer or a printed metallic ink.

Figure 4:
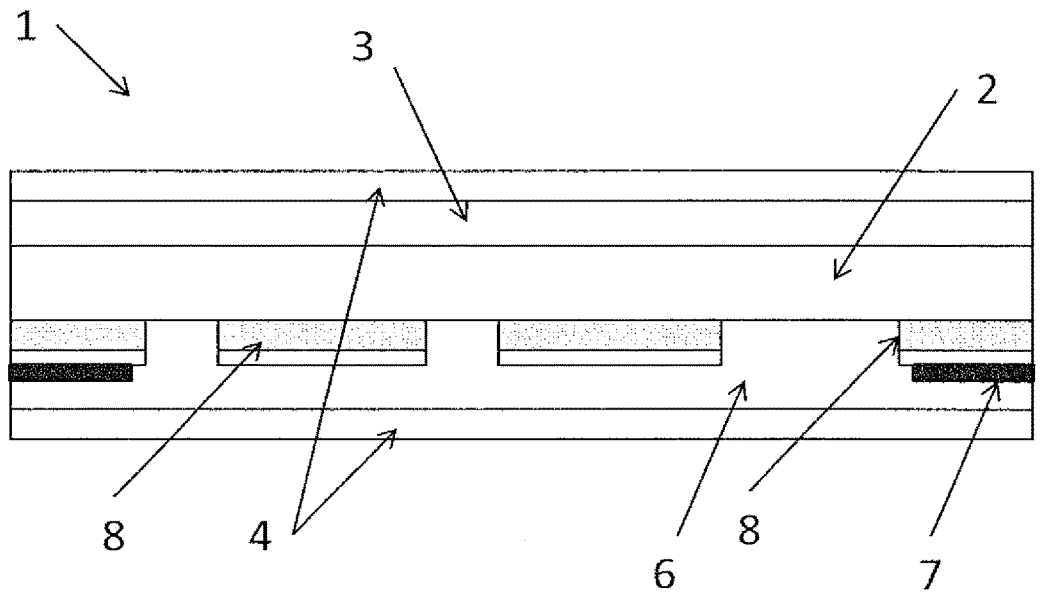
FIG. 4 shows a section through an example thread bearing machine-readable material and metallised regions.

FIG. 4 shows the addition of a patterned metallised layer 8 into the security thread 1. As can be seen in FIG. 4, the patterned metallised layer 8 may be at least partially coincident with the magnetic layer 7 (in the sense of overlying it for example). Other regions of the layer may be located separately and distally from the magnetic material layer 7. One way to produce partially metallised/demetallised films in which no metal is present in controlled and clearly defined areas, is to selectively demetallise regions using a resist and etch technique such as is described in U.S. Pat. No. 4,652,015. Other techniques for achieving similar effects are for example: aluminium can be vacuum deposited through a mask, or aluminium can be selectively removed from a composite strip of a plastic carrier and aluminium using an excimer laser. The metallic regions may be alternatively provided by printing a metal effect ink having a metallic appearance such as Metalstar® inks sold by Eckart. The presence of a metallic layer can be used to conceal the presence of a machine readable dark magnetic layer such as layer 7.

When a magnetic material is incorporated into the thread the magnetic material can be applied in any design but common examples include the use of magnetic tramlines or the use of magnetic blocks to form a coded structure. Suitable magnetic materials include iron oxide pigments ($Fe_2O_3$ or $Fe_3O_4$), barium or strontium ferrites, iron, nickel, cobalt and alloys of these. In this context the term "alloy" includes materials such as nickel:cobalt, iron:aluminium: nickel:cobalt and the like. Flake nickel materials can be used; in addition iron flake materials are suitable. Typical nickel flakes have lateral dimensions in the range 5-50 micrometers and a thickness less than 2 micrometers. Typical iron flakes have lateral dimensions in the range 10-30 micrometers and a thickness less than 2 micrometers.

Figure 5:
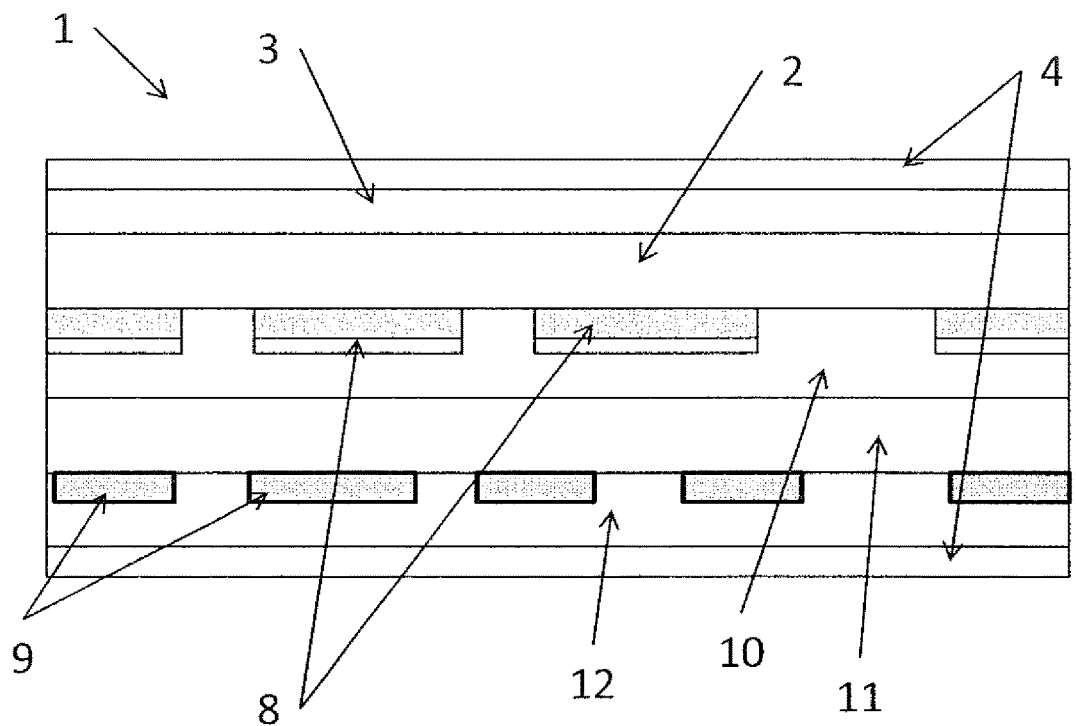
FIG. 5 shows a section through an example thread bearing transparent magnetic material.

In an alternative machine-readable example shown in FIG. 5, a transparent magnetic layer 9 may be incorporated at any position within the device structure. Suitable transparent magnetic layers containing a distribution of particles of a magnetic material of a size and distributed in a concentration at which the magnetic layer remains transparent are described in WO03091953 and WO03091952. In this example, in comparison with the example of FIG. 4, the fluorescent coating 6 (and magnetic material layer 7) is replaced with a laminated adhesive 10 to which is bonded a further layer of PET 11. A fluorescent masking coating 12 is then applied to the PET 11 with regions of transparent magnetic layer 9 located between the PET 11 and coating 12. The transparent magnetic layer can be used in combination with a reflective layer to form a further security feature where the transparent magnetic pattern is visualised in reflection when the secure document in which it is partially embedded Is viewed from the reverse side (i.e. the opposite side to the colourshift effect) as is known from WO2009053673A1.

In each of the examples described, and indeed more generally, it is not essential that the heat-transformable material is applied as an all-over film and it may be applied in a pattern to define identifying information such as geometrical shape, symbol, alphanumeric character or pictorial image. Furthermore, gaps may be left in the layer to define information. The method used to create the predefined patterns or gaps in the heat-transformable material will depend on the material used but example methods include depositing the materials through a mask or laser ablation. If the heat-transformable material comprises multiple layers of different refractive indices then the pattern or gaps can be defined in either, all the layers, a selection of the layers or in a single layer.

We now discuss the application of such threads within security documents.

Figure 6:
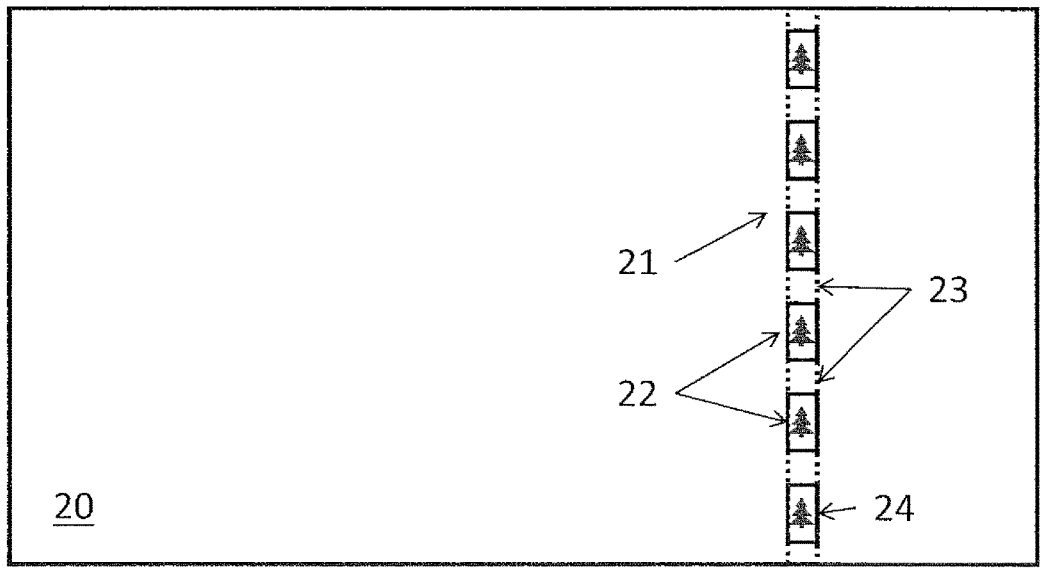
FIG. 6 shows a first example security document in which an image is provided in each windowed region.

In FIG. 6, a bank note 20 is illustrated having a windowed thread 21 passing through it between opposing long edges. A series of window regions 22 are illustrated, these being approximately equally spaced along the length of the thread and being formed by localised reduction in the thickness of the substrate material so as to expose the thread 21 embedded therein. Each windowed region has the geometry of a rectangle. Between adjacent windows there are positioned bridge regions 23 where the thread remains buried within the substrate material. As is illustrated in FIG. 6, within each window indicia 24 are visible, in this case taking the form of a tree motif. A similar tree motif is positioned within each window 22 of the thread 21. The tree motif is visible in reflective light due to the material within the region defined by this tree motif having a different response to incident light than the surrounding photonic material layer upon the thread within the window 22. In the present case for example, the tree motif exhibits an optically variable effect as a function of viewing angle, for example transferring between a red colour to a green colour as it is moved from left to right in the orientation of the drawing. The surrounding region may provide a different optical effect such as an optically variable effect in the infrared part of the spectrum for example which, under visible light and to the naked eye, may cause the area to be largely transparent.

Figure 7:
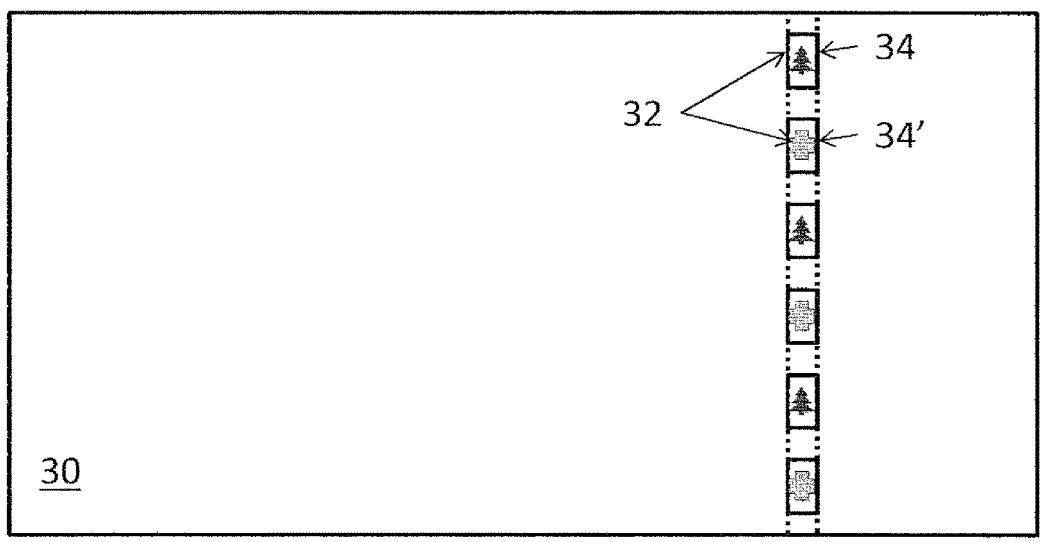
FIG. 7 shows a second example in which two different images are provided in alternating windowed regions.

Referring now to FIG. 7, in this drawing, components having equivalent reference numerals to that of FIG. 6 have a similar second digit although each begins with the digit 3, representing the figure number. Thus, the document 30 again has windows 32 and equivalent bridges. In this case, the heat-transformable material of the thread has been subjected to two different heat treatment processes. The first process is equivalent to that in FIG. 6 and results in a motif 34 in the form of a tree which is the same as that in FIG. 6. The tree motifs are positioned along the thread in alternate windows. Interspersed between these windows is a second motif in the form of a cross 34'. In this case, not only is the geometry of the heat application different from that of the motif 34, so as to form the cross shape, but the heating process has different parameters in terms of temperature and duration. Thus it may be performed with a die which is different from that for producing the motif 34. For example the motif 34' may exhibit an optically variable effect transition from blue to green as the document is moved left to right in the frame of FIG. 7, whereas in comparison, the motif 34 may transition between red and green.

Figure 8:
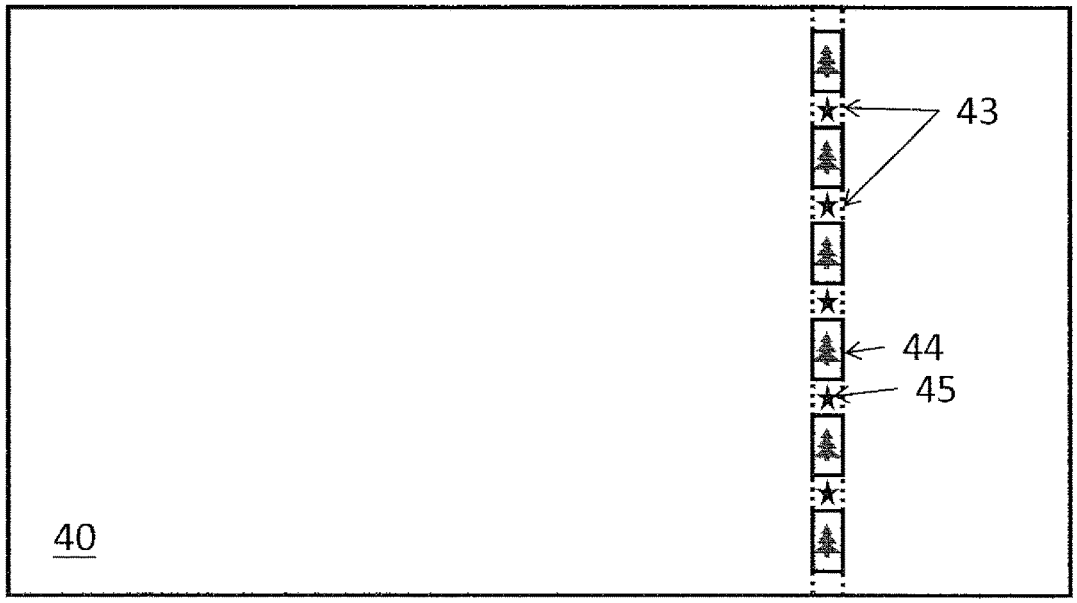
FIG. 8 shows a third example in which a first image is provided in each windowed region and a second image is provided in each bridge region.

In FIG. 8, the security document 40 has a similar appearance under reflected light as that of FIG. 6, namely with tree motifs 44 being existent in each window. A first heat treatment is used to produce the tree motifs 44. A second heat treatment is used to produce a star motif 45 in the thread material which is embedded within each of the bridge regions 43 between the window regions. Since the motif 45 in each bridge region 43 is embedded within the material, a higher temperature and/or longer duration of heat treatment process may be used. In addition, greater application of pressure may be used to ensure rapid conduction of heat through the intervening substrate material. As will be appreciated, the star motif is not visible at all in reflected light since it is hidden by the reflection of the paper substrate above it. However, the star shaped motif 45 does become visible in transmitted light. In many cases, an embedded motif may not require an optically variable or wavelength specific response, merely being visible by the production of contrast due to its shadow or silhouette effect. However, if the region is illuminated in a transmitted arrangement with a specific narrow frequency band of light, then the photonic properties of the material may be used to selectively transmit or reflect wavelengths within that specific band. This may mean that the motif might be visible under illumination with blue light, and not when illuminated with red light for example. As a further example an interference structure could be provided which reflects at infra-red wavelengths and is largely transparent at shorter wavelengths such as red light, whereas it could then be thermally patterned to reflect under red light illumination.

Figure 9:
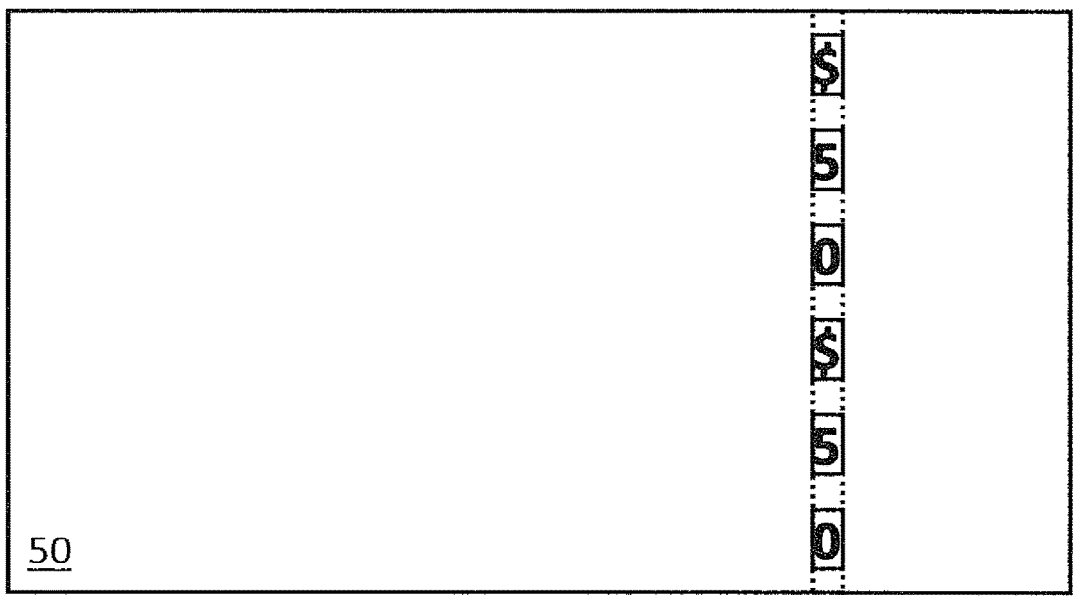
FIG. 9 shows a fourth example in which a repeating sequence of images is provided in adjacent windowed regions.

As illustrated in FIG. 9, the security document 50 exhibits a repeating pattern of three different motifs in the form of a "$", "5", "0". These may be achieved by similar heat application processes, albeit with different shaped dies themselves, or indeed using different heat treatments to produce different optical effects. The document 50 therefore has a thread with two repetitions of "$50" running along it indicating for example a denomination of 50 dollars. As in this case, the concept is that motifs in different adjacent windowed regions may combine to have a meaning in the form of a multicharacter phrase.

Figure 10:
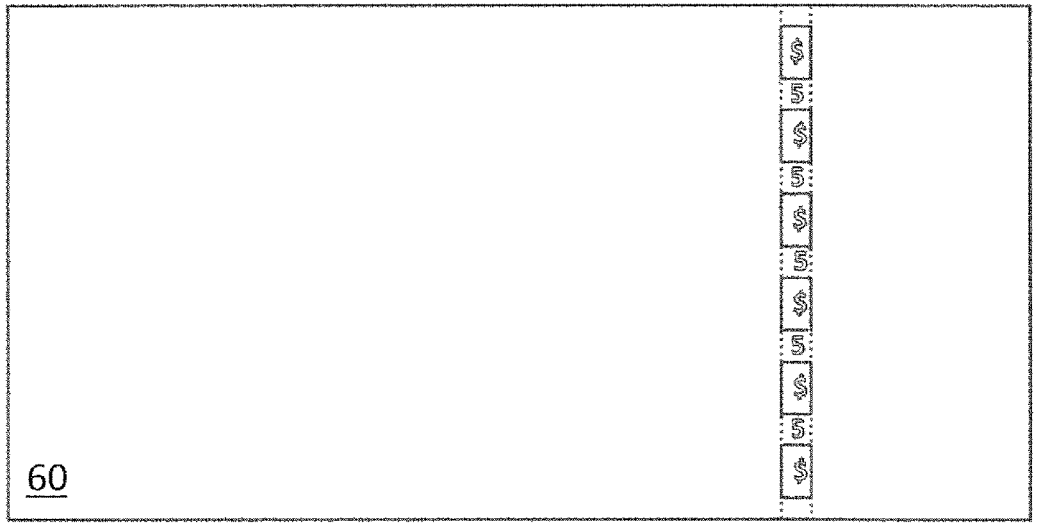
FIG. 10 shows a fifth example in which a sequence of images is provided in adjacent windowed and bridge regions.

This concept may also be applied as illustrated in FIG. 10 where the document 60 exhibits dollar motifs in each of the windowed regions and hidden five motifs in each of the bridge regions which are therefore only visible during a transmissive arrangement of illumination and observation. As will be understood, it is not necessarily the case that the motifs in the windowed regions are only visible in reflection and indeed they may well be also visible in a transmissive arrangement. Thus in the case of the document 60, when illuminated in the transmissive arrangement, the windowed and bridge regions spell out a "$5" repeating pattern indicating a 5 dollar denomination.

Figure 11:
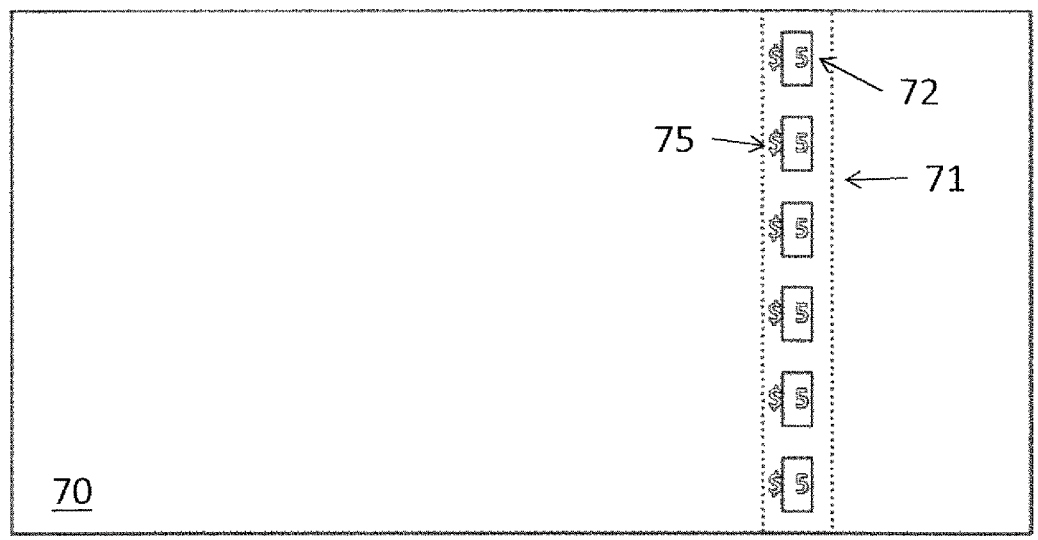
FIG. 11 shows a sixth example in which expanded bridge regions are provided to provide an image positioned laterally with respect to an adjacent windowed region.

In each of the earlier examples, the regions are approximately as wide as the thread itself. This however is not essential. As is illustrated in FIG. 11, the thread 71 of the document 70 is wider than the windowed regions 72. This provides for bridge regions not only positioned directly between windows along the axis of the thread, but also provides for the bridge regions being extended so as to enclose the windows and therefore provides for the positioning of motifs spaced laterally from an axis line defining the windows along the thread. As is illustrated in FIG. 11, if the motifs in each of the bridge and window regions are language characters, then the two motifs can be "read" together side by side. In the case of document 70, a numeral 5 is positioned within each of the windowed regions 72 and a dollar symbol 75 is positioned in the expanded bridge region to the left of each window such that the motif reads "$5" indicating for example a 5 dollar denomination bank note.

Figure 12:
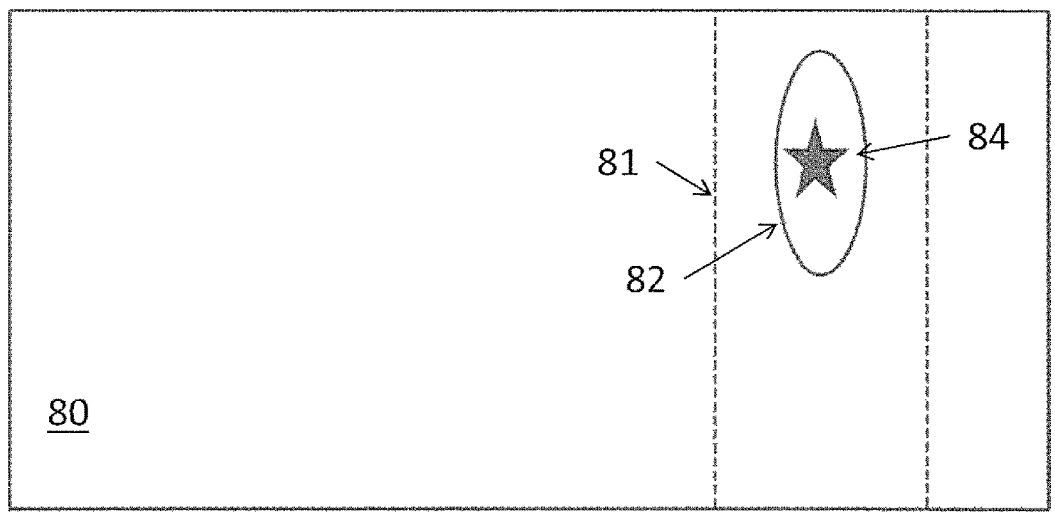
FIG. 12 shows a first side of a seventh example document having a large two-sided window including an image.

In FIG. 12 a rather different design of security document 80 is illustrated. This has a very wide "thread" 81 which may be formed for example by the processes described in WO00/39391 in particular. In this case the windowed region 82 is in the form of an oval shape rather than the rectangular shapes described in the earlier examples. In this case the window is a true ("two-sided") window through the entire document itself meaning that there is no paper substrate material present upon either side of the thread within the window region 82. Thus the only material present here is that of the security thread bearing the heat-transformable material and this may be transparent to visible light for example or at least translucent. As is illustrated, a motif in the form of a star shape 84 is positioned within the window, this being formed by a suitable heat treatment process causing a change in the photonic crystal material structure and therefore its optical response. It should be noted that this star shape 84 is visible in both transmitted and reflected light.

As a further distinction over the security threads discussed in the above examples, the security thread 81 is only buried along its two elongated edges meaning that the majority of the thread is exposed on one side of the security document 80. Thus, in FIG. 12, the only part of the security thread which would be visible from one side is that containing the oval region 84.

Figure 13:
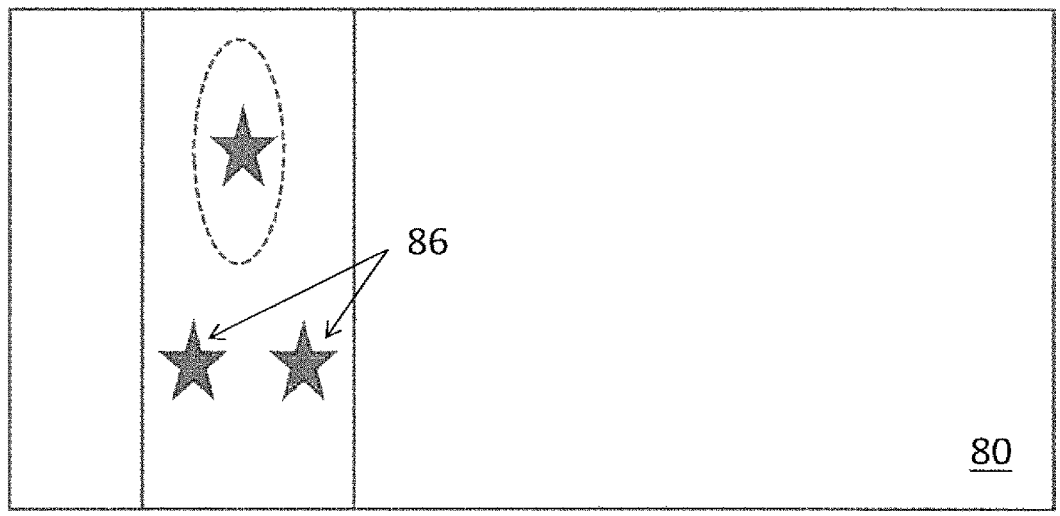
FIG. 13 shows a reverse side of the seventh example document illustrating two further images in the heat-transformable material of the exposed thread; and, FIG. 14 shows the first side of the seventh example under transmissive illumination conditions.

FIG. 13 shows the opposite side of the document 80. In this case, the full extent and rectangular form of the thread 81 is visible as this overlies the document substrate material beneath apart from in the region of the oval window 82. As is illustrated in FIG. 13, two further star shaped motifs are provided these being for reflective observation. Strictly speaking, these additional star shapes are present within a one-sided "window" of the thread since there exists no substrate material overlying them. However, only the star shaped motif within the region 82 is present within a two-sided window. The star shaped motifs which are in the "one-sided" window are illustrated at 86.

Figure 14:
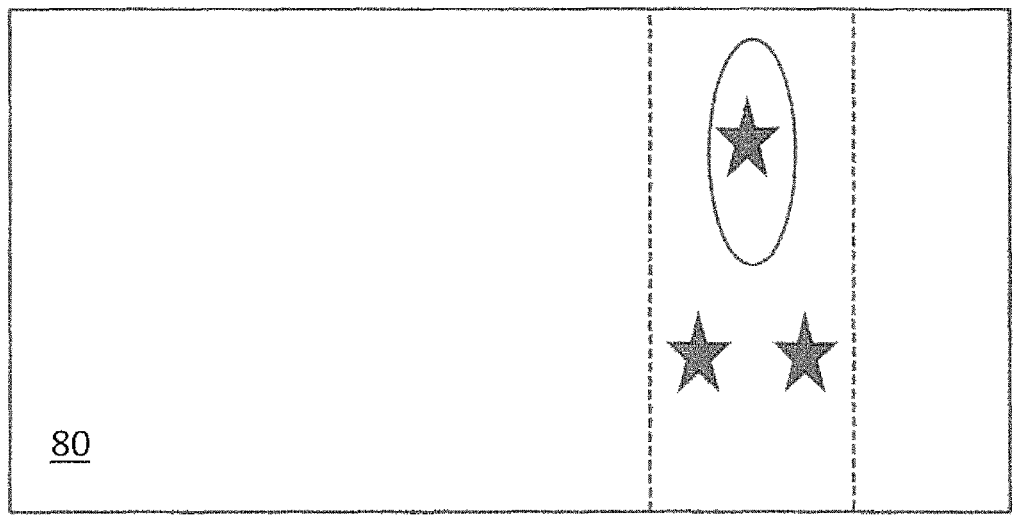

In FIG. 14, there is illustrated the view of an observer when the side of the document 80 shown in FIG. 12 is observed when lit from behind the plane of the drawing and therefore in transmission. In this case the "silhouette" of the three star shapes may be seen.

The examples described above may each be modified so as to provide configurable optical effects in the ultra violet, visible and infrared parts of the electromagnetic spectrum at the choice of the skilled person. Although much of the description has focussed upon the motifs themselves, which are only visible due to contrast with the surrounding region, it will be appreciated that those surrounding regions, where the heat-transformable material is present, may be engineered to provide optical (including optically variable) effects in each of the wavelength bands mentioned above.

This invention therefore provides registrable images, motifs and indicia with respect to windowed or bridge regions of embedded security threads by the use of materials whose properties may be modified by a thermal treatment. Such material structures produce complicated and different to counterfeit optical responses which provides additional capabilities to security document manufacturers in terms of securing the security documents.

The invention claimed is:

1. A method of forming a security document, comprising:
   i) providing a thread comprising at least one region of heat-transformable structured interference material, the material having an initial optically variable effect, caused by periodicity within the material, which is transformable in response to applied heat;
   ii) integrating the thread with a document substrate material during a substrate forming process, so as to produce a security document substrate having on at least one surface at least one windowed region in which the thread is exposed at the substrate surface, and at least one bridge region in which the thread is not exposed, and thereafter
   iii) applying a patterned heat process thereby causing a structural modification in the one or more regions of heat-transformable material of the thread, the structural modification comprising a change in the periodicity of the structured interference material, so as to produce an observable optically variable effect representative of the heat pattern at one or more predetermined positions with respect to one or more of the windowed region or bridge region, wherein the observable optically variable effect is different from the initial optically variable effect,
   wherein in step (iii), the patterned heat process is applied to the bridge region so as to cause the structural modification in the heat-transformable material by transmission of the heat to the heat-transformable material via intervening substrate material forming the bridge, and
   wherein the applying of the patterned heat process in step iii) is performed either a) by thermal conduction using a surface of an applied member, the surface of the applied member being provided with a heat pattern in the form of an image, or b) by a laser wherein the laser is used to generate a heat pattern in the form of an image.

2. A method according to claim 1, wherein the patterned heat process is applied at a temperature in excess of a maximum temperature used in the substrate forming process of step (ii).

3. A method according to claim 1, wherein the patterned heat process applies a localized elevated temperature, sufficient to cause structural modification, to the heat-transformable material in a two dimensional pattern or a three dimensional pattern.

4. A method according to claim 1, wherein the patterned heat process is applied at a position with respect to the security document which is registered with respect to one or each of the windowed region or bridge region.

5. A method according to claim 1, wherein the structural modification to the heat-transformable material is irreversible.

6. A method according to claim 1, wherein, when a plurality of windowed regions are present, then the patterned heat process is applied to two or more of the plurality of regions.

7. A method according to claim 6, further comprising using different heat patterns according to the respective windowed region or bridge region which is processed.

8. A method according to claim 7, wherein when the one or more windowed regions are processed and the one or more bridge regions are processed, the method comprises applying a first pattern to the windowed regions and a second pattern, different from the first pattern, to the bridge regions.

9. A method according to claim 1, wherein, when a plurality of bridge regions are present then the patterned heat process is applied to two or more of the plurality of regions.

10. A method according to claim 1, wherein the observable optically variable effect produces an image.

11. A method according to claim 1, wherein at least one of the initial optically variable effect or the observable optically variable effect is an optical effect in one or more of the infra-red, visible or ultraviolet region of the electromagnetic spectrum.

12. A method according to claim 1, further comprising, applying a first patterned heat process to a first region of the heat-transformable material and applying a second patterned heat process to a second region of the heat-transformable material, wherein the first and second patterned heat processes are different and result in respective different observable optical effects.

13. A method according to claim 1, wherein the heat-transformable material is a photonic crystal having an inverse opal structure in which a periodic array of voids is provided within a matrix material.

14. A method according to claim 1, wherein the heat-transformable material is a Bragg stack material.

15. A method according to claim 1, wherein the applied member is a linear or rotary stamping die.

16. A method according to claim 1, wherein the thread is wider than a windowed region such that the windowed region is bordered by a bridge region and wherein a first image is placed within the windowed region and a second image is placed within the bridge region laterally adjacent the first image.

17. A method according to claim 1, wherein a windowed region is provided upon each side of the security document at a common location so as to produce a two-sided window within which the security document substrate is absent.

18. A method according to claim 1, further comprising applying to the security document one or more of: a foil, a holographic optical element, printing ink, intaglio printing.

* * * * *